Sept. 20, 1938.  H. E. SIPE  2,130,932
METHOD OF MAKING SEPARABLE INTERLOCKING FASTENERS
Original Filed Sept. 1, 1933
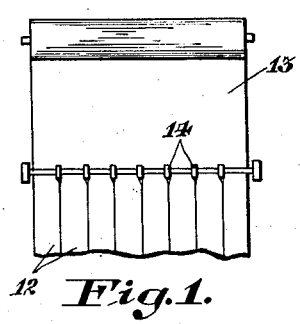
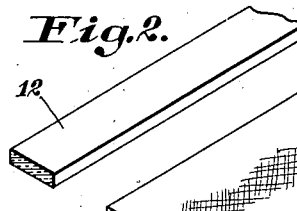
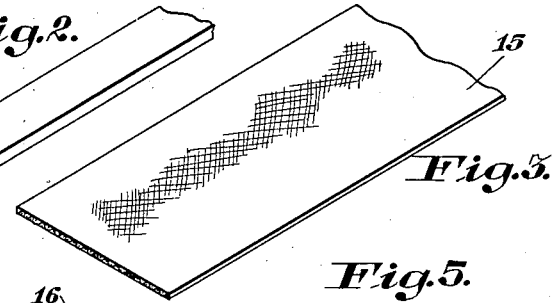
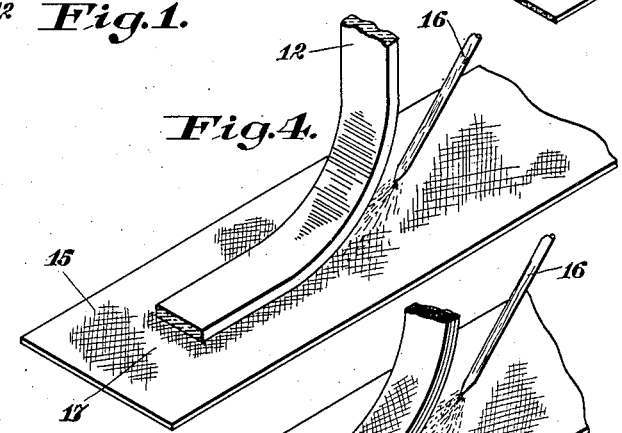
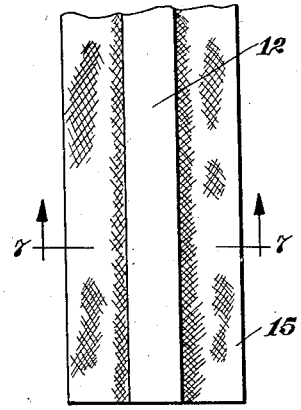
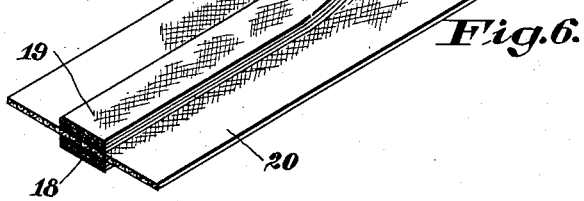
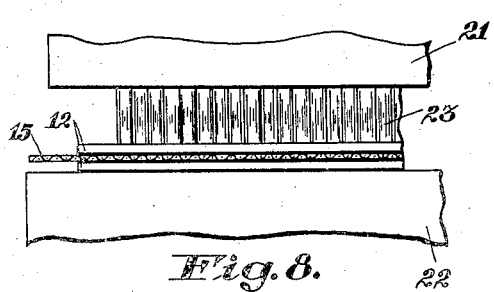
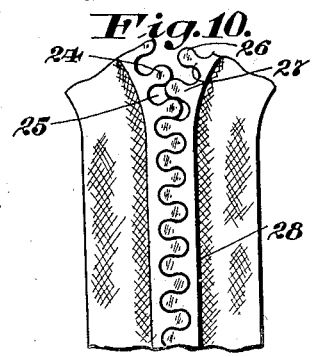
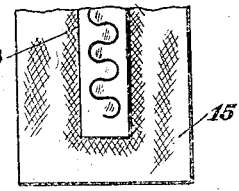
INVENTOR.
Harry E. Sipe
BY Kelley & Chisholm
ATTORNEY.

Patented Sept. 20, 1938

2,130,932

UNITED STATES PATENT OFFICE 2,130,932

METHOD OF MAKING SEPARABLE INTERLOCKING FASTENERS

Harry E. Sipe, New York, N. Y., assignor to Talon, Inc., a corporation of Pennsylvania Application September 1, 1933, Serial No. 687,798
Renewed February 25, 1938

1 Claim. (Cl. 154—2)

My invention relates to separable interlocking fasteners and has for its general object, to provide an improved method of making certain forms of such fasteners.

In my prior Patent No. 1,719,856, I have disclosed and claimed a separable interlocking fastener which is adapted to be made from rubber or other flexible material and having strips provided with projections formed of the flexible material, such projections being adapted to interlock with corresponding projections on another strip.

The object of the present invention is to provide a cheap and simple method of manufacturing fasteners of the general type disclosed in the aforesaid patent.

According to the invention, fastener strips are formed by securing together solid flexible strips having the desired size of the finished fastener and making a single cut through the central portion of the flexible pieces to divide the same into two strips each having gear-tooth-like projections which are so shaped as to interlock with one another when they are intermeshed.

In the accompanying drawing, I have shown for purposes of illustration, one embodiment which my invention may assume in practice. In the drawing:

Fig. 1 is a plan view showing diagrammatically how the fastener strips may be initially prepared;

Figs. 2 and 3 illustrate respectively the rubber and fabric strips;

Fig. 4 illustrates the step of securing together the rubber strip and wider carrier tape;

Fig. 5 is a plan view of the assembly prior to cutting;

Fig. 6 is a view similar to Fig. 4 showing a modified construction of the narrow strips;

Fig. 7 is a cross-section on line 7—7 of Fig. 5;

Fig. 8 is a vertical elevation showing the cutting operation;

Fig. 9 is a bottom plan view of the cutting die; and

Fig. 10 shows a pair of finished fastener strips assembled together.

In large production the narrow strips 12 can be cut from a wide sheet 13 of rubber or similar material by a series of cutters 14. The fabric tape 15 is preferably woven to the desired width so that it will have smooth edges. The rubber strips 12 may be cemented, vulcanized or otherwise stuck in place on the fabric tape 15. In Fig. 4 there is illustrated a nozzle 16 applying cement between the contacting surfaces.

In this operation the rubber strip is cut to the desired length and is preferably spaced from the lower end of the fabric tape to leave a cross-connecting portion 17. The assembly as shown in Fig. 5 comprises the wide fabric tape and the relatively narrow strips of rubber or other material extending along the longitudinal central portion of the fabric tape. Preferably, there are two such narrow strips on opposite sides of the wide tape.

In Fig. 6 instead of rubber strips, I have illustrated several plies of fabric 18 on the lower side of the strip and 19 on the upper side. The central ply extends laterally to provide a flexible carrier tape 20 which serves as a convenient means for attaching the fastener in an article. The fabric plies are stuck together by a suitable cement or glue and preferably have some rigidity in order to provide strength and stability in the fastener.

The assembled strips are now ready for cutting and the cutting die as illustrated in Fig. 8, comprises an upper block 21 and a lower block 22. The upper block carries a die having its lower edge ground to a sharp cutting edge. This knife die is curved to provide a series of loops 23 of the shape illustrated or of any suitable shape for making the desired form of fastener elements.

The result after the cutting operation, is shown in Fig. 10, and comprises a pair of fastener strips having projections 24 uniformly spaced along each strip, the projections on one side being staggered relative to the projections on the opposite side. The cutting operation leaves recesses 25 between the projections and of corresponding size and shape so that the projections on one side will fit into the recesses on the opposite side when the fastener is closed. Each projection has a head 26 joined to the strip by a relatively narrow neck 27. The fastener strips as thus formed are integrally joined at the lower end so that no additional connecting means need be provided at this point.

The narrow strips provide shoulders 28 on one or both sides of the strips and if desired, a slider may be mounted to ride along these shoulders. The operation of a slider is fully described in my aforesaid patent.

As a result of my invention it will be observed that an exceedingly simple method of making the fastener shoulders has been devised and which will be very inexpensive in production especially since a pair of the fastener strips are formed by one series of operations.

While I have shown and described in this application one embodiment which my invention may assume in practice, it will be understood that this embodiment is merely for the purpose of illustration and that various other forms may be devised within the scope of my invention as described in the appended claim.

What I claim as my invention is:

The method of making separable interlocking fasteners which comprises securing an elongated flexible strip to a relatively wide fabric tape, cutting through the longitudinal central portion of said tape and attached strip along a sinuous line to provide gear tooth-like projections and recesses on the opposing halves of the strip in staggered relation and adapted to intermesh one with the other, and said halves of the strips being left connected at one end thereof.

HARRY E. SIPE.